April 17, 1951  H. T. MACKENSEN  2,549,105
FEED NUT SLEEVE FOR DRILLS
Filed Dec. 1, 1948
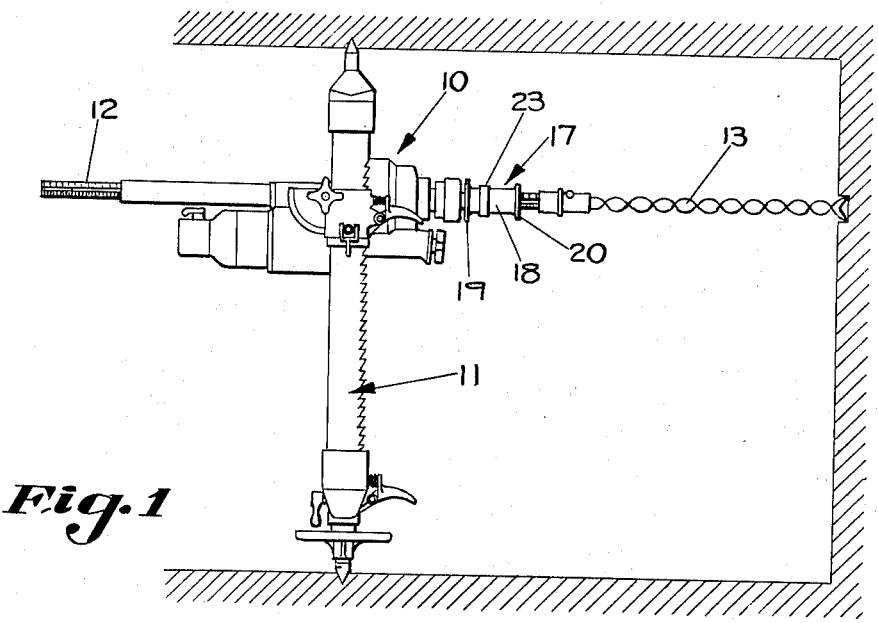
Fig. 1
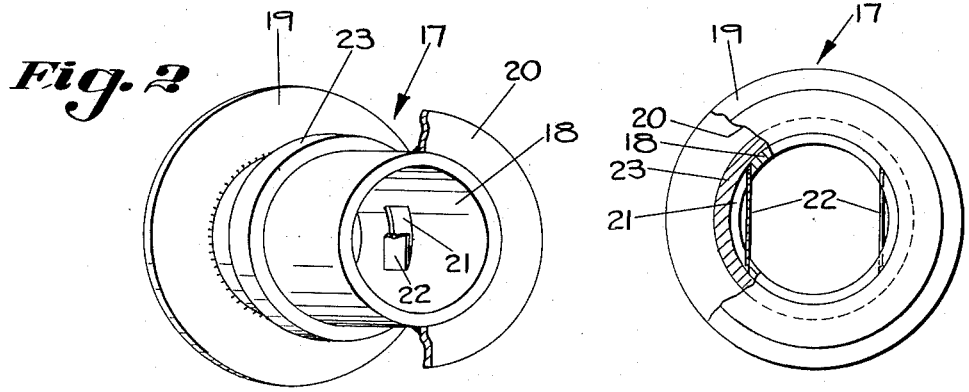
Fig. 2
Fig. 3
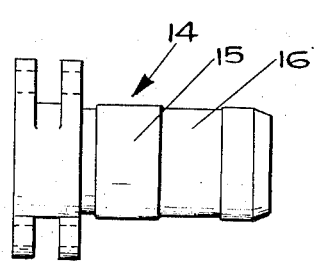
Fig. 4
INVENTOR;
HAROLD T. MACKENSEN,
BY
ATT'Y.

Patented Apr. 17, 1951

2,549,105

UNITED STATES PATENT OFFICE 2,549,105

FEED NUT SLEEVE FOR DRILLS

Harold T. Mackensen, Columbus, Ohio, assignor to The Jeffrey Manufacturing Company, a corporation of Ohio Application December 1, 1948, Serial No. 62,825

1 Claim. (Cl. 255—46)

This invention relates to a feed nut sleeve for drills, such as mine drills.

An object of the invention is to provide improved mechanism of the above mentioned type in which a feed nut sleeve is provided with one or more flat holding springs which will hold the sleeve on the two separable halves of a split feed nut.

Other objects of the invention will appear hereinafter, the novel features and combinations being set forth in the appended claim.

In the accompanying drawings,

Fig. 1 is a side elevational view of a drill mounted on a mine jack including the improved feed nut sleeve of my invention;

Fig. 2 is a perspective view of the improved feed nut sleeve, with parts broken away;

Fig. 3 is a front elevational view of the sleeve, with parts broken away and in section; and Fig. 4 is an elevational view of a feed nut with which the improved sleeve cooperates.

The patent to O. B. Jones, No. 2,090,330, dated August 17, 1937, illustrates in considerable detail a drilling mechanism including a split feed nut which follows generally the construction of the drill and feed nut with which the improved feed nut sleeve of my invention cooperates, except for certain modifications in the feed nut which are specifically illustrated in Fig. 4 of the drawings and mentioned hereinafter.

In Fig. 1 there is illustrated a complete drilling mechanism 10 adjustably mounted on an adjustable mine jack 11, the complete assembly being shown ready for operation adjacent a room face in a mine. The drilling mechanism includes a threaded feed shaft 12 to which is attached a removable drill 13. Drilling is, of course, effected by rotating the shaft 12 and the drill 13 and simultaneously feeding the two forward to drill a hole in the mine room face, while said drilling mechanism 10 is supported and anchored by the mine jack 11.

As disclosed in detail in the above mentioned patent to Jones, the feeding of the shaft 12 is controlled by a split feed nut. Such a split feed nut is seen at 14 in Fig. 4 of the drawings. It includes a pair of pivotally connected halves which together in general constitute a cylindrical member 15 having a peripheral groove 16 intermediate the ends thereof.

Feed nut sleeve 17 is adapted to slide over the two halves of the feed nut 14 and clamp them in operating relation with the shaft 12. Said feed nut sleeve 17 may be removed by simply giving it a jerk along the axis of the feed nut 14 and shaft 12 which will permit the two halves of the feed nut 14 to separate, thus freeing the shaft 12 from the controlling influence thereof.

The particular feature of my invention is the construction of the feed nut sleeve 17 which provides for its ready and relatively easy sliding over the feed nut 14 to clamp the two halves thereof in operative relation with the shaft 12 while insuring its being frictionally held in position and providing for the ready removal thereof without requiring any tools whatever.

Said feed nut sleeve 17 includes a cylinder 18 which at opposite ends is provided with reinforcing upwardly extending disc flanges 19 and 20 which are preferably welded to the outer opposite extremities of said cylinder 18. Intermediate its ends the cylinder 18 is provided with a pair of diametrically spaced alined slots 21 preferably formed by milling along diametrically opposite positions of the cylinder 18, the axis of the slots 21 being perpendicular to the axis of the cylinder 18. Stated another way, the side edges of the slots 21 are parallel with the planes which pass through the ends of the cylinder 18.

Adjacent each of the slots 21 and extending into the cylinder 18 is a flat metal spring 22. The slots 21 obviously provide windows or openings which provide for the flat springs 22 extending into the interior of the cylinder 18, the two springs 22 being diametrically opposite each other. To hold the springs 22 in their positions and to provide recesses which effect this holding function there is a circumscribing ring 23 rigidly attached to the exterior of the cylinder 18 which surrounds it and covers up the outside of each of said slots 21. As clearly illustrated in Fig. 3 of the drawings, the ring 23 cooperates with the cylinder 18 adjacent each slot 21 to provide a recess which will lock the spring 22 in position without requiring it to be rigidly attached to said cylinder 18.

To clamp the two halves of the feed nut 14 in position it is only necessary to slide the feed nut sleeve 17 over said feed nut 14. When this is done the flat springs 22 will be received in the peripheral groove 16 and frictionally prevent unauthorized removal of said feed nut sleeve 17. However, by the simple expedient of an operator grasping the feed nut sleeve 17 with his hand and jerking it along the axis of the feed nut 14 and shaft 12 it is possible to disengage the flat springs 22 from the groove 16, thus removing the feed nut sleeve 17. This particular construction of the feed nut sleeve has been found to be very simple and efficient and free from some of the difficulties encountered by previous devices.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

A feed nut sleeve for a drill including a cylinder adapted to slide over and lock a split feed nut, means providing an elongated slot in the inner peripheral surface of said cylinder, the axis of said slot being perpendicular to the axis of said cylinder, ring means attached to said cylinder and covering the entire exterior of said slot, and a spring in said slot locked to said cylinder in recesses at opposite ends thereof and extending into the interior of said cylinder intermediate the spring ends.

HAROLD T. MACKENSEN.

REFERENCES CITED

The following references are of record in the file of this patent:

UNITED STATES PATENTS

| Number | Name | Date |
|---|---|---|
| 442,837 | Ward | Dec. 16, 1890 |
| 574,368 | Johnson | Dec. 29, 1896 |
| 790,990 | White | May 30, 1905 |
| 1,005,145 | Bicalky | Oct. 10, 1911 |
| 1,066,817 | Holt et al. | July 8, 1913 |
| 1,339,437 | Dickelman | May 11, 1920 |
| 1,842,405 | Johnson | Jan. 26, 1932 |
| 2,260,712 | Harrison | Oct. 28, 1941 |
| 2,457,523 | Bird | Dec. 28, 1948 |

FOREIGN PATENTS

| Number | Country | Date |
|---|---|---|
| 26,672 | Great Britain | Aug. 30, 1906 |